(12) United States Patent
Chuang (10) Patent No.: US 7,694,927 B2
(45) Date of Patent: Apr. 13, 2010

(54) SCREEN SUSPENSION CONNECTING MEANS

(75) Inventor: Min-Lon Chuang, Taipei (TW)

(73) Assignee: Kelly International Corp., Taipei (TW)

( * ) Notice: Subject to any disclaimer, the term of this patent is extended or adjusted under 35 U.S.C. 154(b) by 330 days.

(21) Appl. No.: 11/782,107

(22) Filed: Jul. 24, 2007

(65) Prior Publication Data

US 2009/0028631 A1    Jan. 29, 2009

(51) Int. Cl.
E04G 3/00 (2006.01)
(52) U.S. Cl. .................. 248/276.1; 248/282.1; 248/919
(58) Field of Classification Search .............. 248/551, 248/553, 276.1, 282.1, 919–923; 361/679.02, 361/679.06, 679.07; 70/18, 58
See application file for complete search history.

(56) References Cited

U.S. PATENT DOCUMENTS 1,814,854 A * 7/1931 Ringwald .................... 70/57
3,822,049 A * 7/1974 Saunders ................ 248/223.41
4,025,017 A * 5/1977 Miller .................... 248/297.11
4,266,703 A * 5/1981 Litz ............................ 224/443
4,402,481 A * 9/1983 Sasaki ..................... 248/282.1
4,618,116 A * 10/1986 Johnson .................. 248/222.14
5,246,240 A * 9/1993 Romich et al. ........... 280/304.1
5,692,722 A * 12/1997 Lundagårds ................ 248/553
5,697,233 A * 12/1997 Albert et al. .................... 70/58
6,045,103 A * 4/2000 Costa et al. .............. 248/278.1
6,062,053 A * 5/2000 Ho ............................... 70/233
6,926,244 B1 * 8/2005 O'Neill .................. 248/346.01
7,243,892 B2 * 7/2007 Pfister ......................... 248/371

* cited by examiner

Primary Examiner—Korie Chan (57) ABSTRACT

A suspension connection means that allows fast disconnection includes a connecting base and a connecting portion; the connection base is connected to a cantilever; and the connecting portion is connected to a back of a screen; two sliders on the connecting portion are placed in a slide; a locking plate from the connecting portion slides into a channel on the connecting base; and the screen connected to the connecting portion is removed from the cantilever by pushing a press portion to clear the locking plate out of the channel for removing the connecting portion.

6 Claims, 10 Drawing Sheets

SCREEN SUSPENSION CONNECTING MEANS

BACKGROUND OF THE INVENTION (a) Field of the Invention

The present invention is related to a screen suspension connecting means, and more particularly, to one that is provided with a fast disconnection device.

(b) Description of the Prior Art

As liquid crystal screens become popular, many display centers or stores use the screens to display commodities or other information; however, each screen may cost a lot of money and is vulnerable to be stolen. Therefore, protecting the screen from being stolen has become one of the major concerns in the trade.

Furthermore, support of cantilever is connected to a screen suspension frame with screws. Upon mounting or dismounting the screen from its suspension frame, it takes to align before tightening or loosening all screws one by one; it is inconvenient to work with the screen suspended in air; it is also not convenient to work with a hand tool on the screws; and any act of omission will easily cause the screen to fall on the floor, thus, damaging the screen.

SUMMARY OF THE INVENTION

The primary purpose of the present invention is to provide a screen suspension connecting means to allow fast mounting or dismounting of the screen and prevent it from being damaged.

To achieve the purpose, the present invention includes a connecting base and a connecting portion. The connecting base is connected to a support cantilever and the connecting portion is connected to a back of the screen. Wherein, the connecting base includes a combination axle, multiple, two preferred, slides and one or a plurality of locking channel; and the combination axle links the connecting base to the cantilever; a spacing between both slides is gradually reducing from the top to the bottom. The connecting portion includes a primary plate, and a locking plate. The primary plate includes multiple, two preferred, sliders; the spacing between two sliders is also gradually reducing from the top to the bottom in corresponding to that between both slides so that when each slide is placed above each slide to create a packing status to prevent the primary plate from sliding down. The locking plate is connected to the primary plate and includes a combination portion, one or a plurality of locking portion, and a press portion. The combination portion is connected to the primary plate; the locking portion extends from the combination portion and is backwardly curved; and the press portion is connected to the locking plate and protruding from an edge of the connecting base. Accordingly, when both sliders are placed in their respective slides, the locking plate slides into the locking channel to create a locked status. If an operator desires to remove the locking plate, he/she has to push the press portion for the locking portion to clear from the locking channel for the connecting portion to be moved up.

Furthermore, the press portion may be located at where above the locking portion to facilitate operation by the operator.

One or a plurality of lockset is disposed to the connecting base; one or a plurality of locking hole is respectively provided on the primary plate and the locking plate of the connecting portion for each lockset. When the connecting portion engages the connecting base, a spindle of the lockset passes through both locking holes to provide vertical stop force to prevent the locking plate from being moved up even the press portion is pressed so to achieve the purpose of burglar-proof.

A shelter may be further disposed on a perimeter of the connecting base to conceal screws that connect the screen to the connecting portion thus to prevent attempted loosening up screws directly from a back of the screen.

DETAILED DESCRIPTION OF THE PREFERRED EMBODIMENTS

Figure 1:
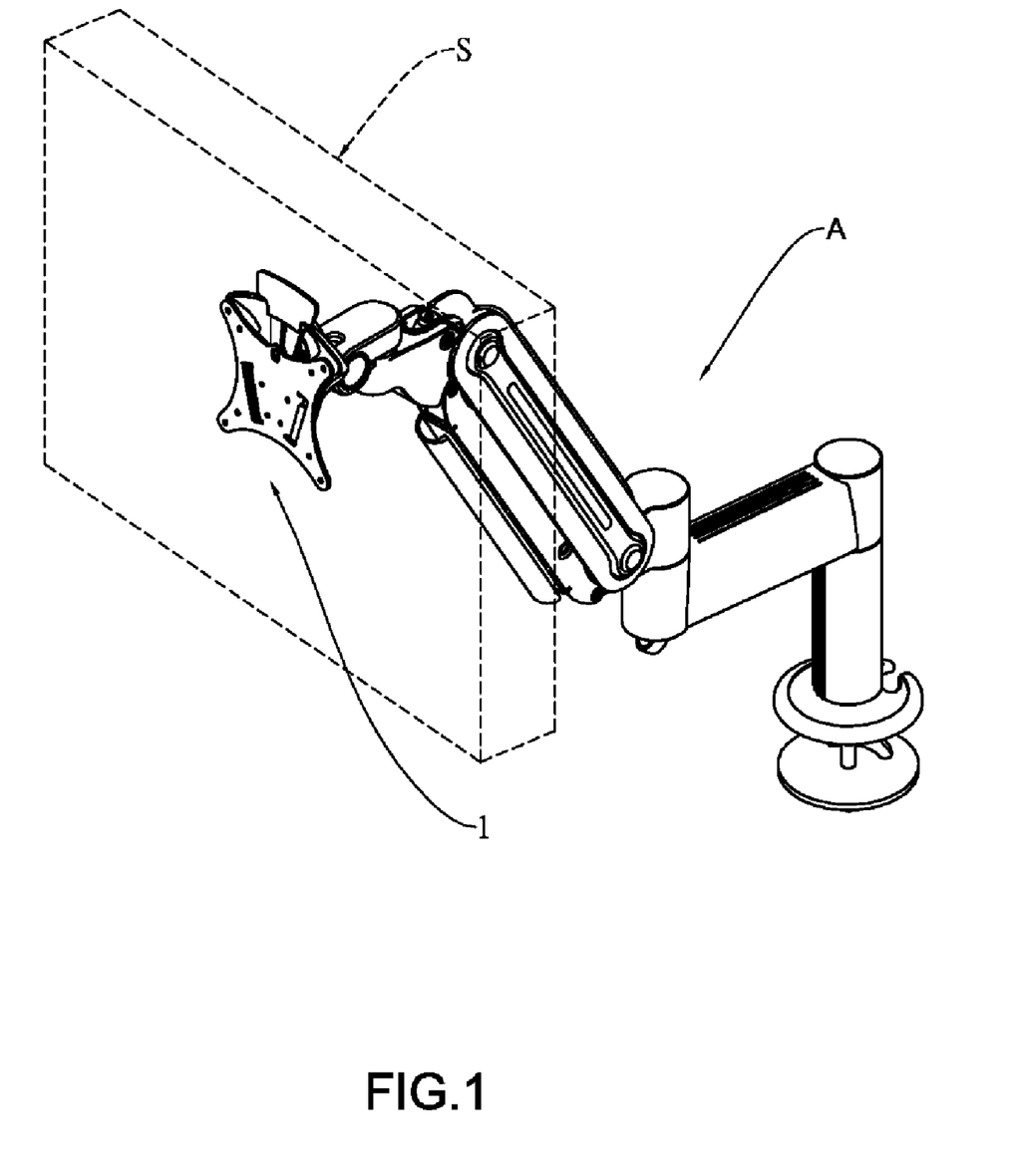
FIGS. 1, 2, and 3 are schematic views showing combinations of a preferred embodiment of the present invention.
Figure 2:
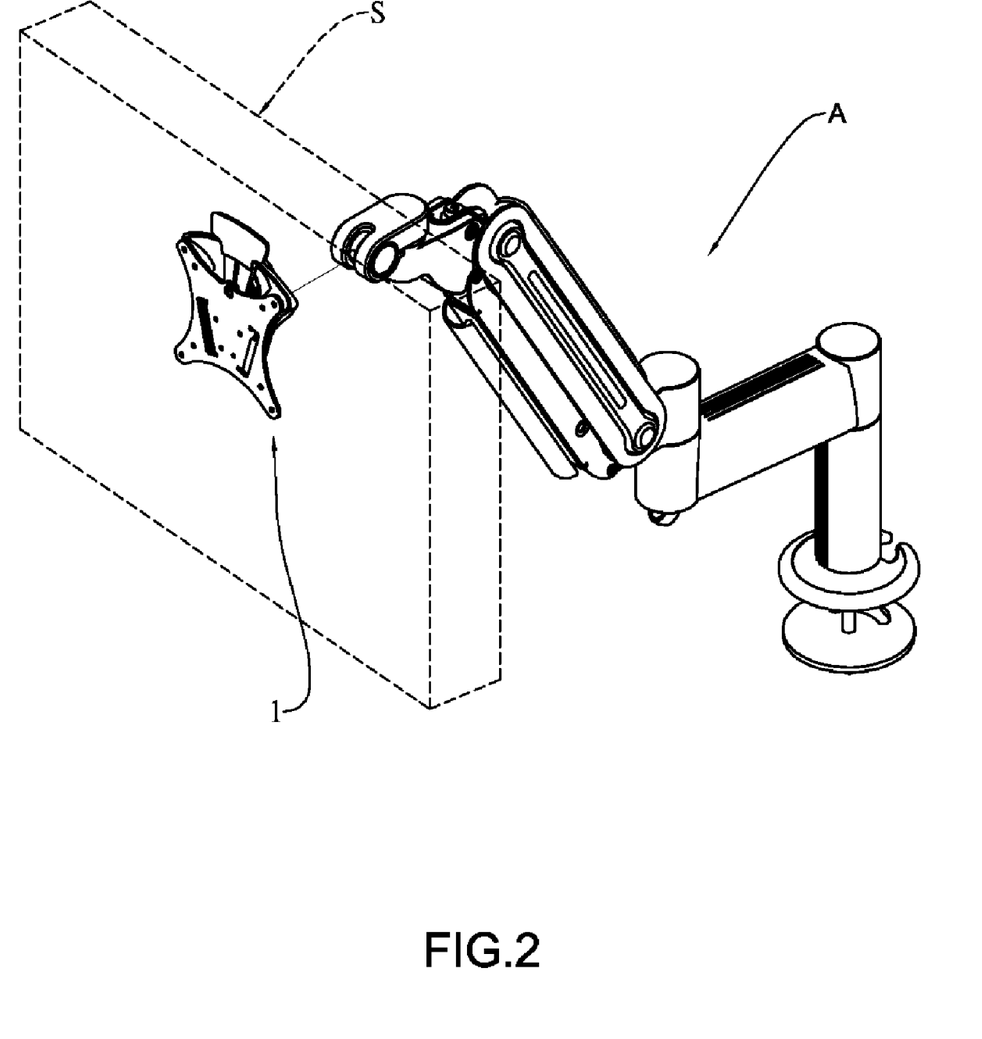
Figure 3:
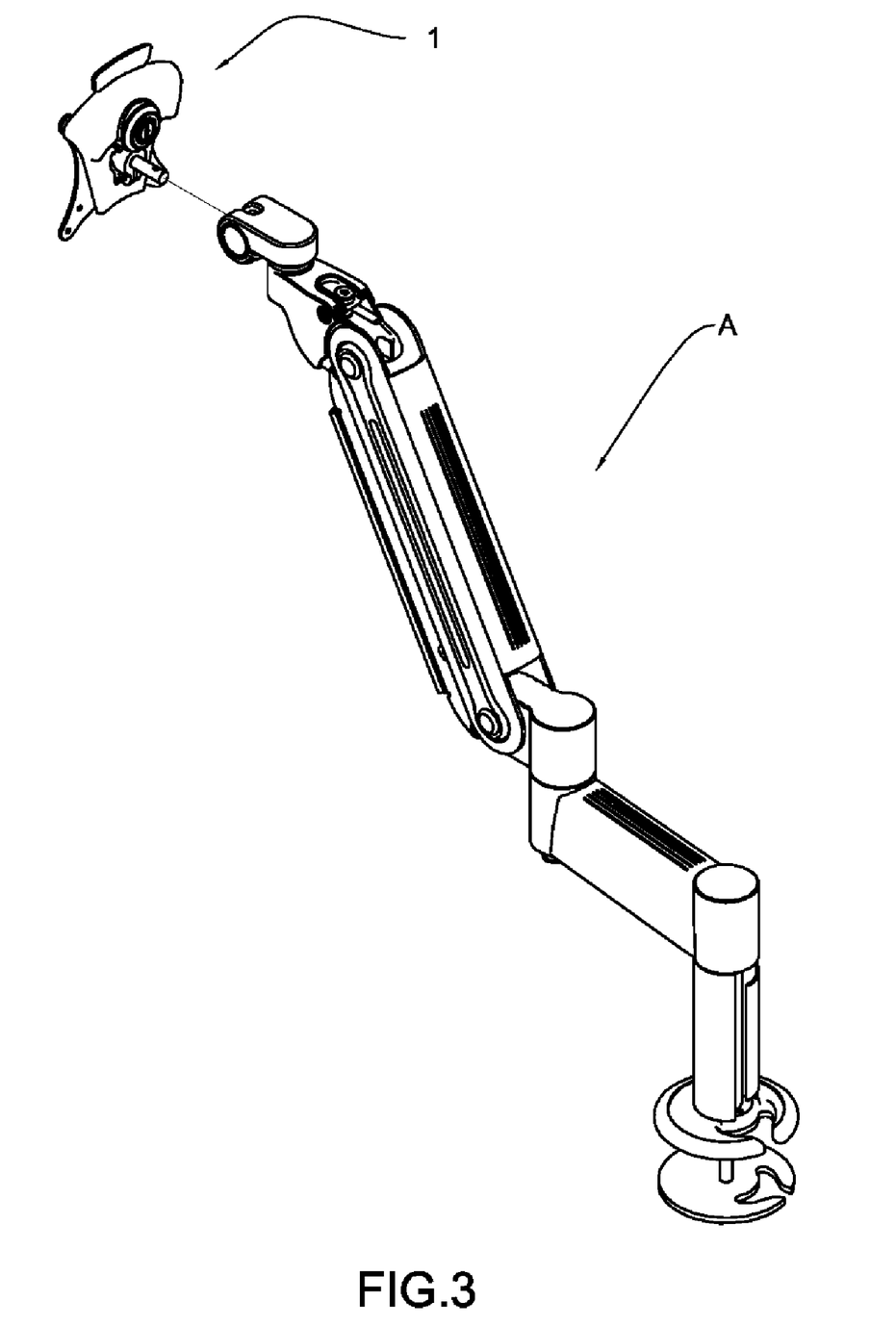

Referring to FIGS. 1, 2, and 3 for a preferred embodiment of the present invention, a screen suspension connecting means 1 applied to connect a screen S and a cantilever A is essentially comprised of a connecting base 10 connected to the cantilever A and a connecting portion 20 connected to a back of the screen S.

Figure 4:
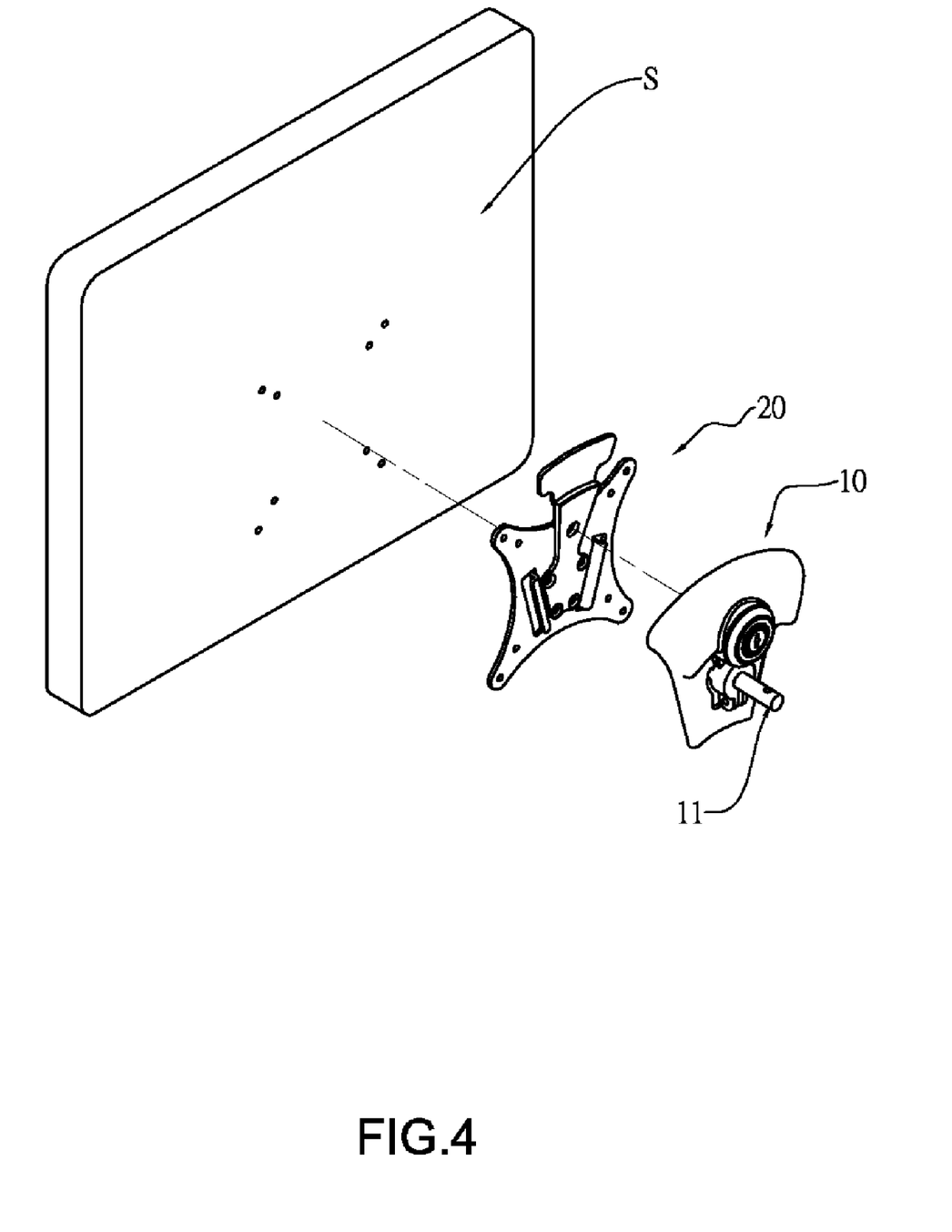
FIGS. 4, 5, and 6 are perspective views of the preferred embodiment of the present invention.
Figure 5:
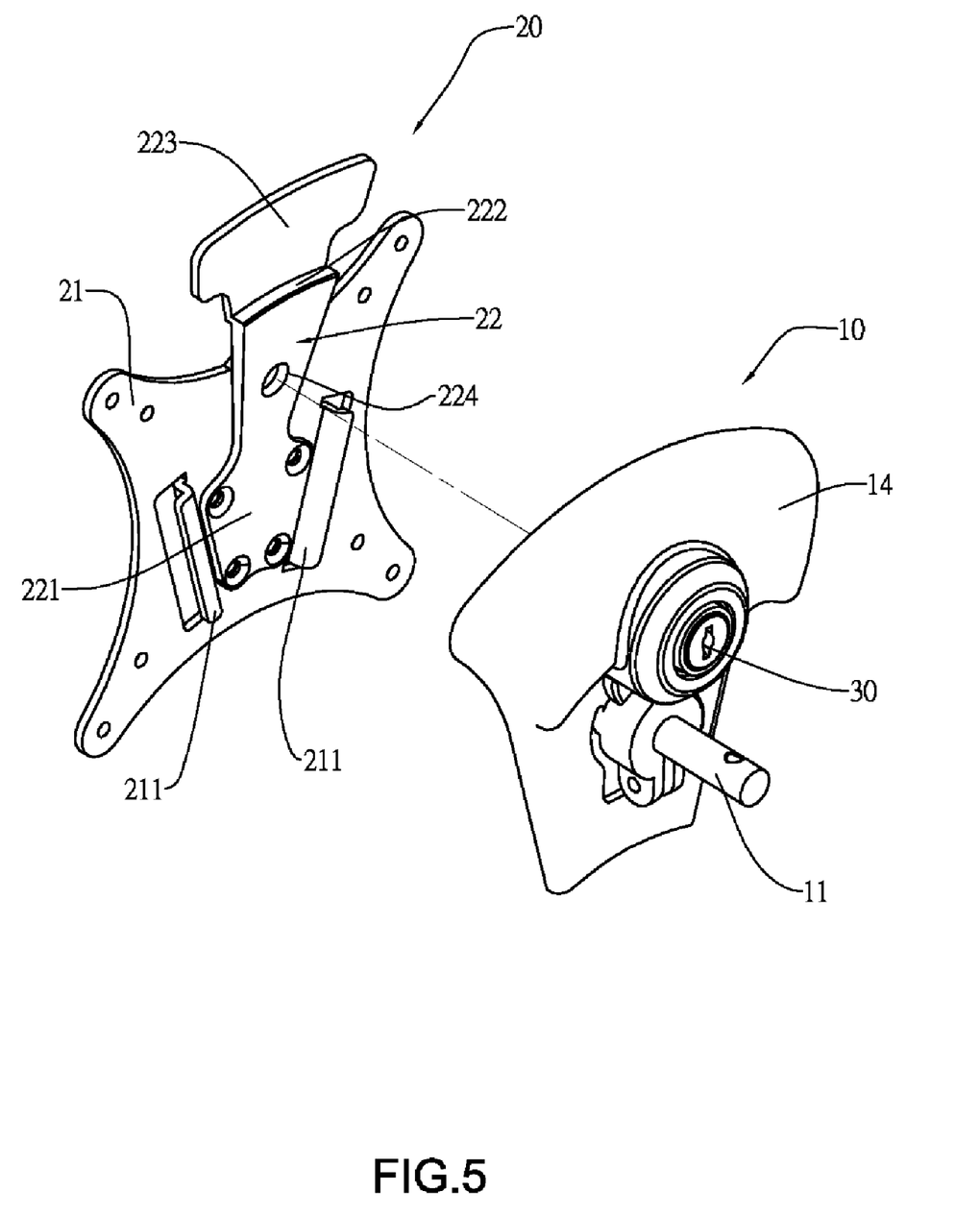
Figure 6:
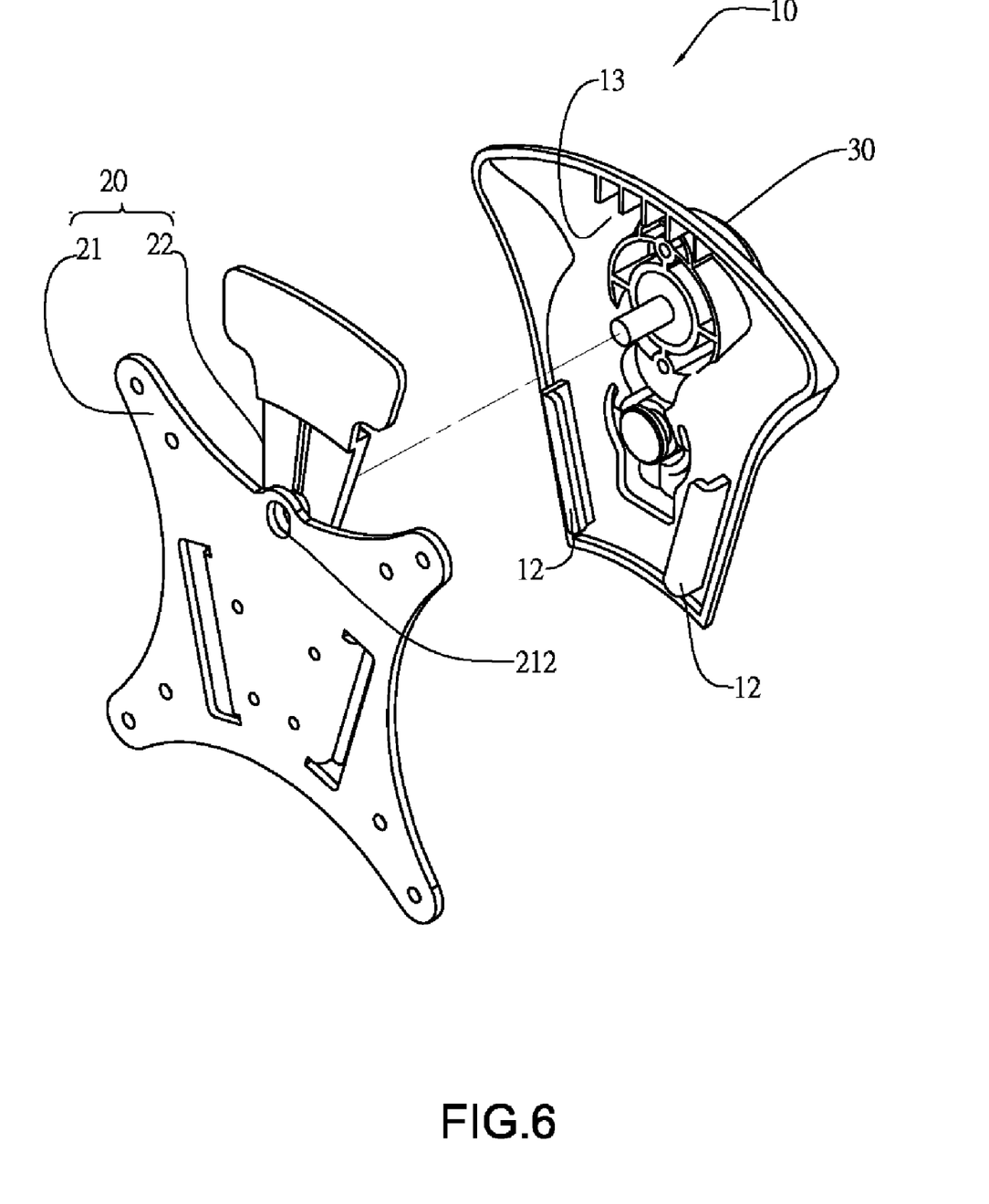

Now referring to FIGS. 4, 5, and 6, the connecting base 10 includes a combination axle 11, multiple, two preferred, slides 12, and one or a plurality of locking channels 13. The combination axle 11 is combined to the cantilever A; and spacing between both slides 12 gradually reduces from the top to the bottom. The connecting portion 20 includes a primary plate 21 and a locking plate. The primary plate 21 includes multiple, two preferred, sliders 211; location of both sliders 211 are corresponding to that of both slides 12, and spacing between both sliders 211 also gradually reduces similar to that between two slides 12. Accordingly, when each slider 211 slides from where above the slide 12 into the slide 12, a packing status is created to stop the primary body 21 from sliding down further. The slide 12 indicates an L-shaped strip and the slider 21 indicates an inverse L-shaped strip for both of the slider 12 and the slider 21 to be interlocked to each other. The locking plate 22 is connected to the primary plate 21 and includes a combination portion 221, one or a plurality of locking portion 222, and a press portion 223. The combination portion 221 is connected to the primary plate 21; the locking portion 222 extends from the combination portion 221 and is backwardly curved; and the press portion 223 is connected to the locking portion 222. When the connecting portion 20 snaps on the connecting base 10, the press portion 223 protrudes from an edge of the connecting base 10. Therefore, when both sliders 211 on the connecting portion 20 are placed in their respective sliders 12 on the connecting base 10, the locking portion 222 on the locking plate 22 slides into and holding is retained by the locking channel 13 so to secure the connecting portion 20 to the connecting base 10. To remove the connecting portion 20 from the connecting base 10, the press portion 223 is pressed for the locking portion 22 to clear out of the locking channel 13. The present invention therefore is capable of providing a summary mounting procedure, avoiding damaging the screen S due to accidental fall of the screen S onto the ground. Furthermore, the press portion 223 is disposed at where above the locking portion 222 to facilitate operation.

Figure 7:
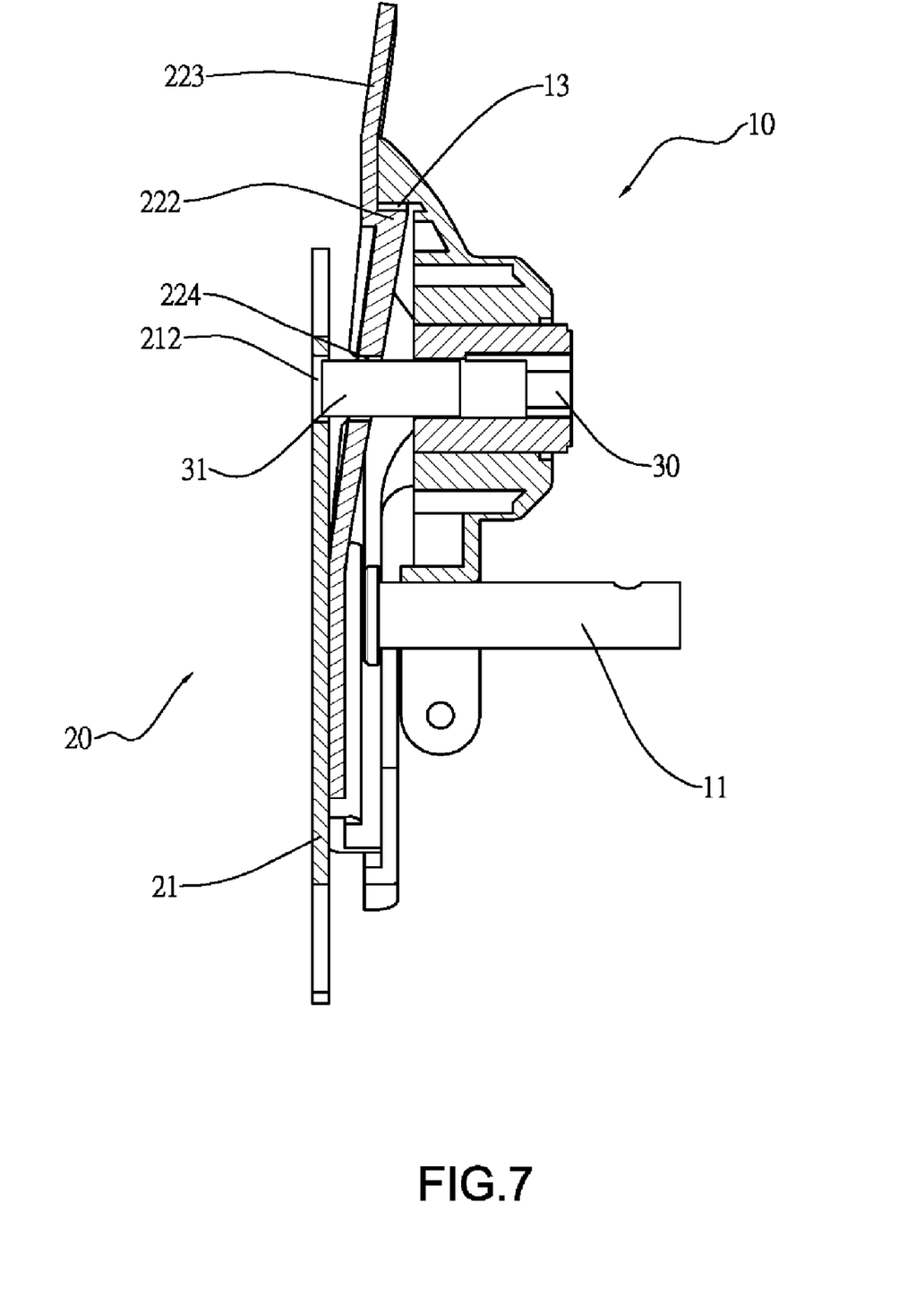
FIGS. 7 and 8 are sectional view of the preferred embodiment of the present invention.
Figure 8:
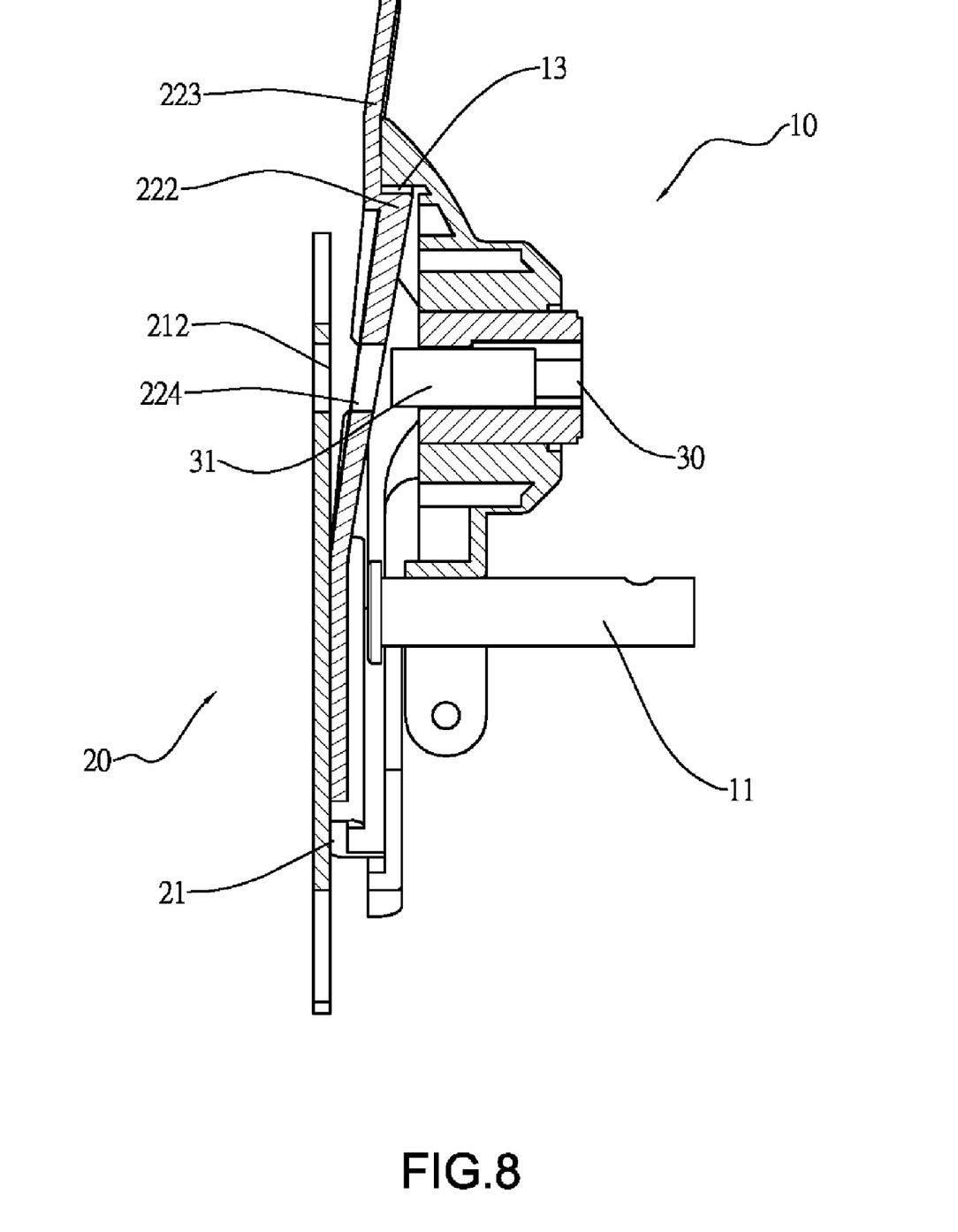

As illustrated in FIGS. 5, 7, and 8, one or a plurality lockset 30 is disposed to the connecting base 10; the locking plate 22 and the primary plate 21 are respectively provided with one or a plurality locking hole 224, 212 to compromise the lockset 30. When the connecting portion 20 snaps on the connecting base 10, a spindle 31 of the lockset 30 penetrates through both locking holes 224, 212 for preventing the connecting portion 20 from moving up against the connecting base 10. The connecting portion 20 will not move up due to penetration by the spindle 31 even with the press portion 223 having been pressed to cause the locking portion 222 to clear out of the locking channel 13. Accordingly, the prevent invention achieves its burglarproof purpose. It is to be noted that any lockset that prevents the connecting portion 20 from being removed out of the connecting base 10 falls within the patent protection sought hereunder; and that the lockset 30 disclosed in the preferred embodiment is just one of those forms.

For further protection of the screen S from being stolen, a shelter 14 as illustrated in FIG. 5 is provided on the perimeter of the connecting base 10 to conceal multiple screws used to connect the connecting portion 20 to the screen S to prevent a burglar from directly loosening up each screw to forthwith remove the screen S.

Figure 9:
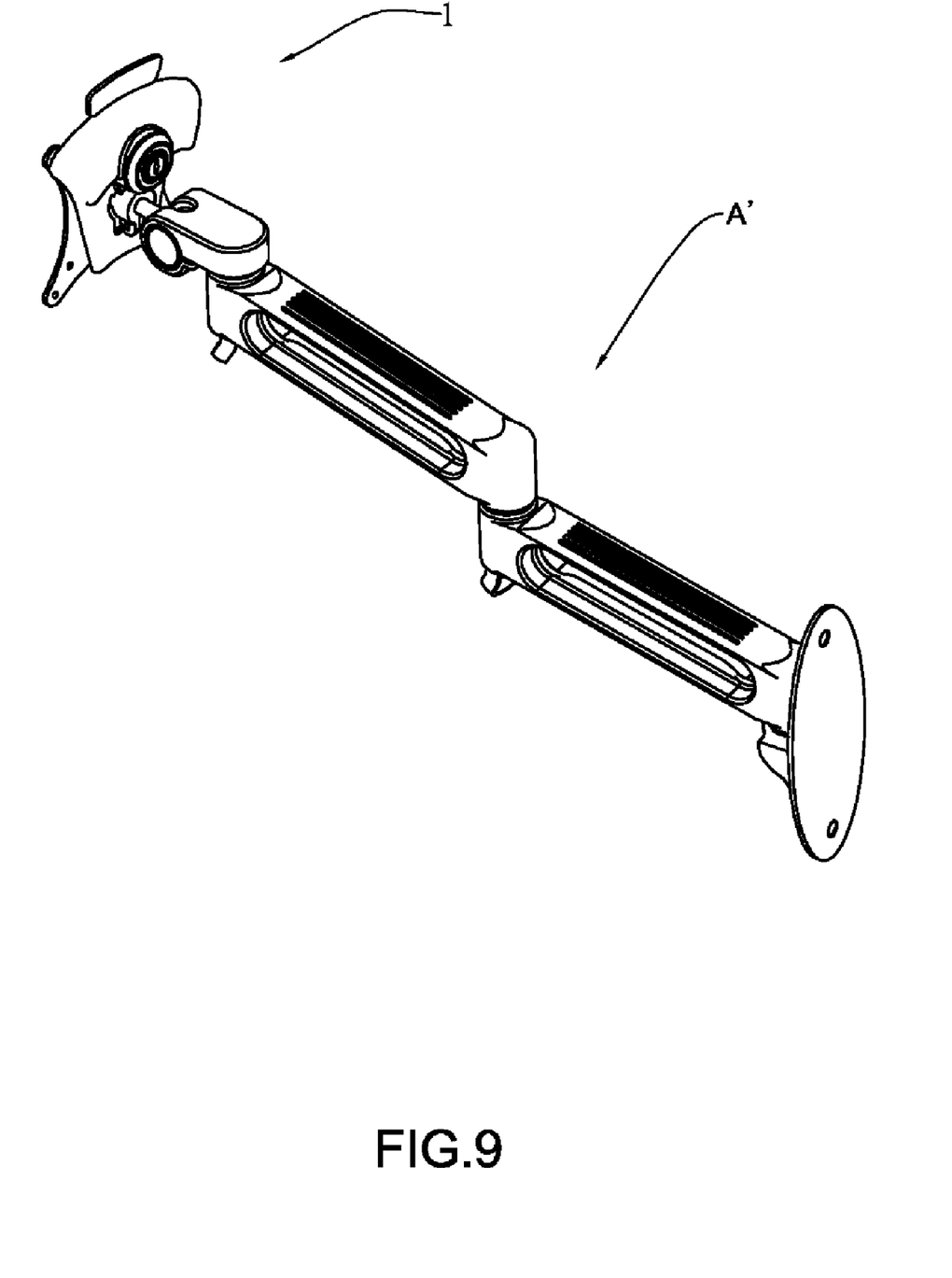
FIGS. 9 and 10 are schematic views showing the preferred embodiment of the present invention connected to other types of cantilever.
Figure 10:
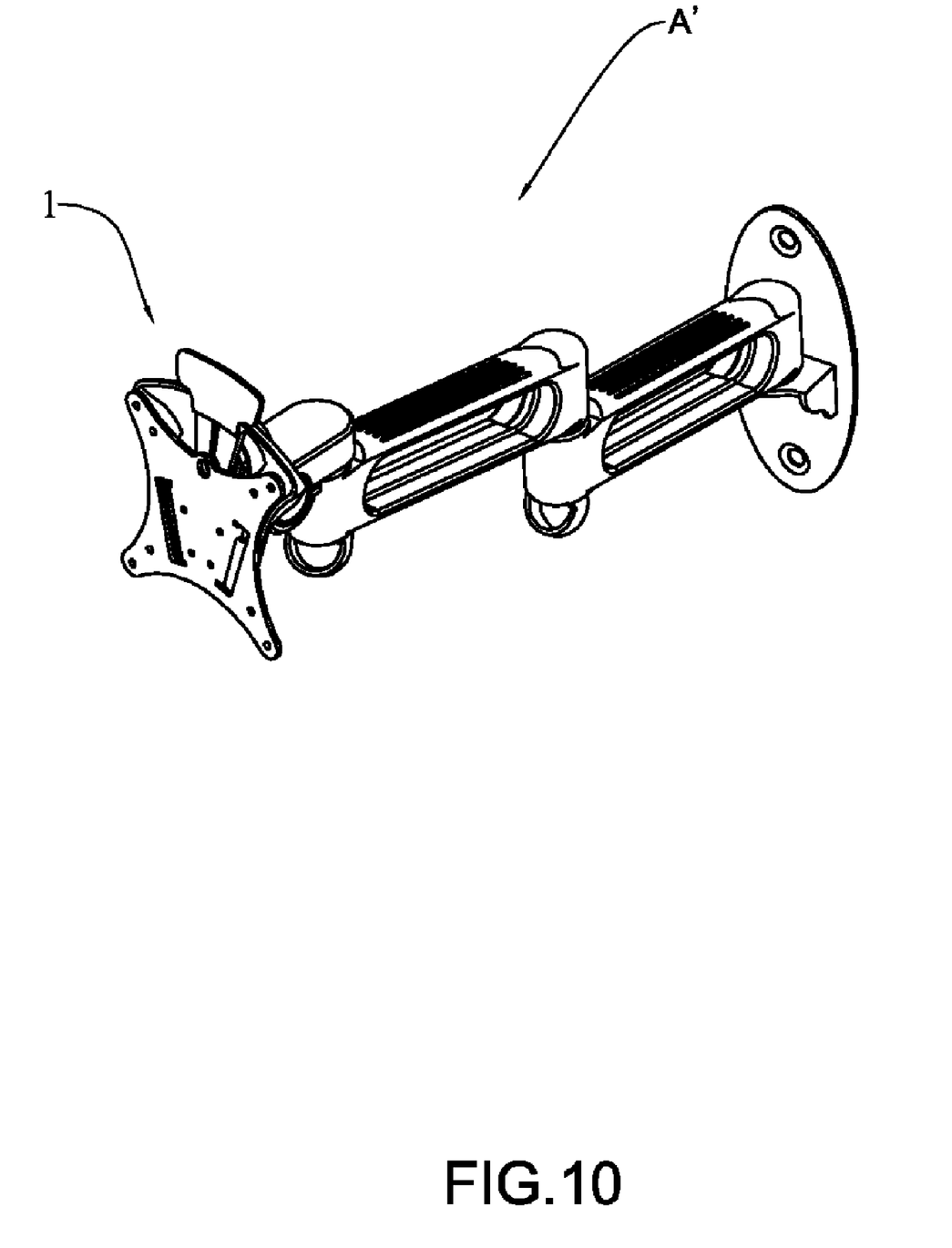

As illustrated in FIGS. 9 and 10, the present invention may be connected to any type of cantilever. For example, the form of a cantilever A' as illustrated is not subject to any restriction.

The prevent invention provides an improved structure of a screen suspension connecting means, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

What is claimed is:

1. A screen suspension connecting arrangement for connecting a screen to a cantilever support comprising:

a cantilever;

a connecting base connected to the cantilever further comprising, an axle, a pair of spaced converging slides, with the space therebetween being gradually reduced from top to bottom, and one or more locking channels;

a connecting portion adapted to be connected to the back of the screen and comprising a primary plate provided with a pair of converging sliders with the space therebetween being gradually reduced from top to bottom, corresponding to that between said slides, a locking plate connected to the primary plate and including, in combination, a locking portion extending from a locking plate connection and curved away from said primary plate and a press portion connected to said locking portion and protruding beyond an edge of said connecting base; and wherein said sliders on the connecting portion can be inserted into said slides, the locking plate then engaging said locking channel.

2. The screen suspension connecting arrangement as claimed in claim 1, wherein the press portion is located above the locking portion.

3. The screen suspension connecting arrangement as claimed in claim 1, wherein one or more locksets are disposed in the connecting base; and one or more locking holes are respectively disposed in the locking plate and the primary plate.

4. The screen suspension connecting arrangement as claimed in claim 1, wherein a shelter is externally disposed in the connecting base.

5. The screen suspension connecting arrangement as claimed in claim 1, wherein the slides are in the form of L-shaped strips.

6. The screen suspension connecting arrangement as claimed in claim 5, wherein the sliders are in the form of inverse L-shaped strips in symmetry with the slides.

* * * * *